United States Patent
Butera et al.

(10) Patent No.: US 7,037,187 B2
(45) Date of Patent: May 2, 2006

(54) SYSTEM FOR DISTRIBUTING AIR TO A ROW OF SEATS IN THE PASSENGER COMPARTMENT OF A MEANS OF TRANSPORT OR INSIDE THE ROOM OF A BUILDING

(75) Inventors: Francesco Butera, Turin (IT); Marco Biasiotto, Turin (IT); Stefano Alacqua, Rivoli Cascine Vica (IT)

(73) Assignee: C.R.F. Societa Consortile per Azioni, Orbassano (IT)

(*) Notice: Subject to any disclaimer, the term of this patent is extended or adjusted under 35 U.S.C. 154(b) by 0 days.

(21) Appl. No.: 11/010,282

(22) Filed: Dec. 14, 2004

(65) Prior Publication Data
US 2005/0130577 A1    Jun. 16, 2005

(30) Foreign Application Priority Data
Dec. 16, 2003   (IT) ........................... TO2003A1007

(51) Int. Cl.
*B64D 13/00* (2006.01)
(52) U.S. Cl. .............. 454/76; 237/12.3 R; 237/12.3 B; 454/121
(58) Field of Classification Search .................. 454/76, 454/155, 156; 237/12.3 R, 12.3 B
See application file for complete search history.

(56) References Cited

U.S. PATENT DOCUMENTS

| | | | | |
|---|---|---|---|---|
| 3,217,788 A | * | 11/1965 | Adam | 165/298 |
| 3,687,054 A | * | 8/1972 | Boberg | 454/76 |
| 3,832,939 A | * | 9/1974 | Kakei et al. | 454/125 |
| 4,326,452 A | * | 4/1982 | Nawa et al. | 454/258 |
| 5,067,509 A | * | 11/1991 | Hunter | 137/14 |
| 5,259,815 A | * | 11/1993 | Stouffer et al. | 454/125 |
| 5,823,009 A | * | 10/1998 | Suzuki et al. | 62/410 |
| 6,059,652 A | * | 5/2000 | Terry et al. | 454/155 |
| 6,582,294 B1 | * | 6/2003 | Butera et al. | 454/155 |
| 6,666,761 B1 | * | 12/2003 | Nystrom | 454/322 |
| 6,843,716 B1 | * | 1/2005 | Butera et al. | 454/121 |
| 6,887,148 B1 | * | 5/2005 | Biasiotto et al. | 454/121 |
| 2003/0114100 A1 | | 6/2003 | Nystrom | |

\* cited by examiner

*Primary Examiner*—Derek S. Boles
(74) *Attorney, Agent, or Firm*—Nixon & Vanderhye P.C.

(57) ABSTRACT

A system for the distribution of air to a row of seats in a passenger compartment of a means of transport, such as for example an aeroplane, train or bus, or in the room of a building, comprises a main duct and a series of outlets. The outlets are without valves for opening and closing, and the flow of the air through the outlets is controlled by control means associated to each outlet that exploit the Coanda effect.

10 Claims, 2 Drawing Sheets

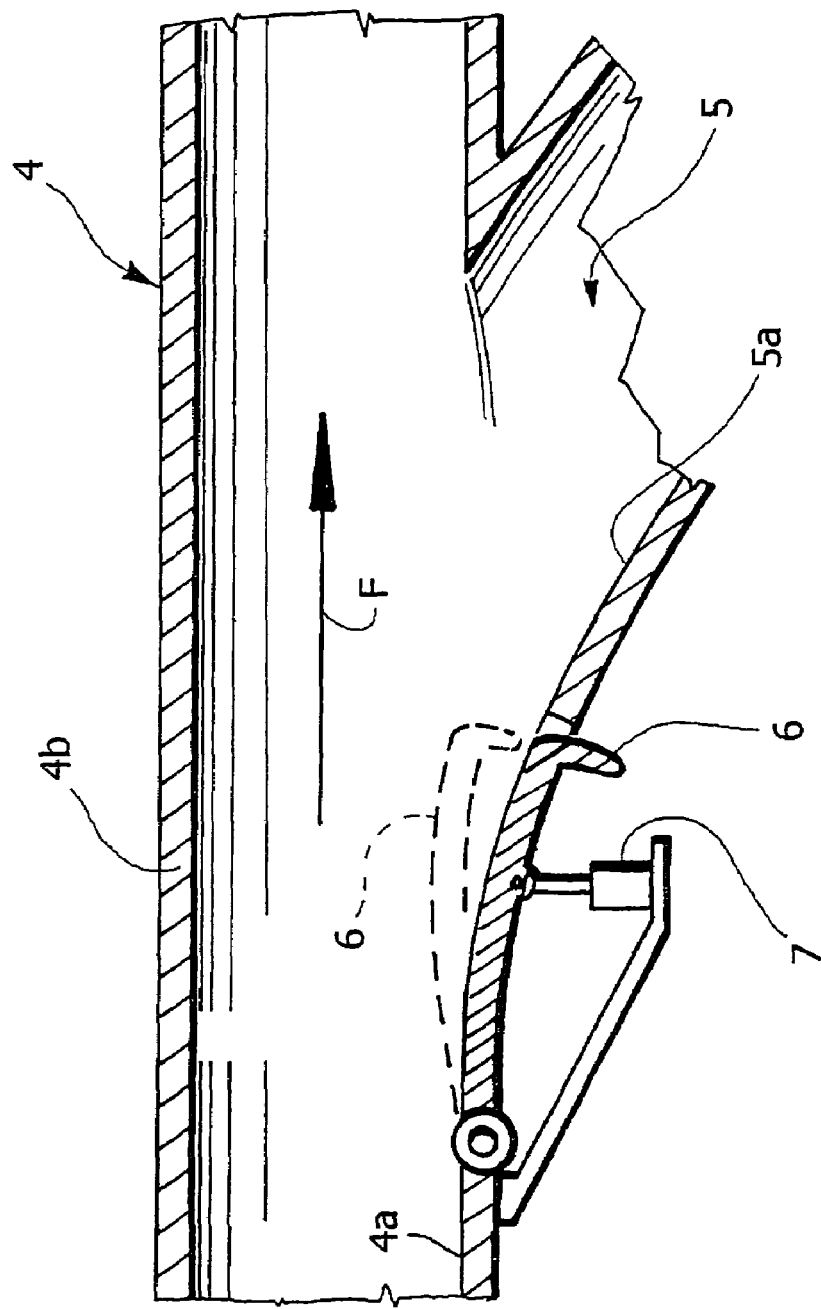

SYSTEM FOR DISTRIBUTING AIR TO A ROW OF SEATS IN THE PASSENGER COMPARTMENT OF A MEANS OF TRANSPORT OR INSIDE THE ROOM OF A BUILDING

SUMMARY OF THE INVENTION

The present invention relates to systems for the distribution of air to a row of seats in a passenger compartment of a means of transport, for example an aeroplane, a train, or a bus, or in the room of a building. In particular the invention relates to systems of the type specified above comprising a duct extending along the row of seats and having a plurality of outlets distributed along the duct, with control means associated to each outlet for control of the passage of air through the latter.

The purpose of the present invention is to provide a system of the type specified above that will be provided with simple and efficient control means.

In order to achieve said purpose, the subject of the invention is a system having the characteristics described above and characterized moreover in that the aforesaid control means associated to each outlet are designed to control the flow of air through said outlet by means of the Coanda effect.

The Coanda effect is the phenomenon whereby a flow of fluid exiting from a duct "sticks" to a wall located in its immediate vicinity. By exploiting the Coanda effect, it is thus possible to control the distribution of a flow coming from a main duct that branches off into two different ducts, without making use of deflecting vanes, which always involve a dispersion of the energy associated to the flow of fluid.

In the case of known systems for the distribution of air to a row of seats, for example on an aeroplane, bus or train, each outlet associated to an individual seat is provided with a valve, either manually-controlled or electrically-controlled, which controls the opening and closing of the outlet, as well as possibly of an outflow opening provided with vanes for orienting the flow.

According to the invention, each of the outlets associated to the main duct of the distribution system may simply consist of an auxiliary duct that branches off from the main duct and that gives out into the environment to be aired, without any valve that controls opening and closing of the outlet. In fact, the means based upon the Coanda effect for controlling the flow associated to each outlet are such as to induce, in a first operating condition, a part of the flow of fluid that traverses the main duct to come out through the respective outlet and, in a second operating condition, are able to "mask" said outlet with respect to the main flow.

In a preferred embodiment of the invention, the aforesaid control means associated to each outlet comprise a mobile element having a first operative position, in which the flow of fluid through the main duct is deviated in part towards the outlet, and a second operative position, in which said outlet is masked with respect to the main flow. In said preferred embodiment, each outlet has a curved wall that branches off tangentially from a corresponding wall of the main duct. In its first operative position, the mobile element is in a retracted condition, in which it does not interact with the flow of fluid through the main duct, so that a part of said flow that laps the aforesaid wall of the main duct exits through the aforesaid outlet, remaining adherent, by Coanda effect, to the aforesaid curved wall of said outlet. In its second operative position, instead, the mobile element of the control means associated to each outlet projects into the flow of fluid through the main duct in such a way as to cause the flow to remain adherent, once again by the Coanda effect, to the opposite wall of the main duct, "skipping" the outlet controlled by said mobile element. In said condition, there is thus no deviation of part of the main flow through the aforesaid outlet.

The aforesaid mobile element may, for example, consist of a portion of the same wall as the main duct which is able to undergo elastic deformation between the aforesaid first position and the aforesaid second position. For the purpose of controlling said movement, it is possible to provide actuator means of any type, such as, for example, a bistable electromagnet, which keeps the element controlled in its position after each activation, or shape-memory actuator means, also preferably of a bistable type, or any other type of actuator. Of course, it is also possible to envisage that the movement of the mobile element associated to each outlet will be controlled manually.

Once again in the case of the preferred embodiment, associated to each outlet is an outflow opening with directional vanes, which may, for example, be controlled electrically.

BRIEF DESCRIPTION OF THE DRAWINGS

Further characteristics and advantages of the invention will emerge from the ensuing description, with reference to the annexed drawings, which are provided purely by way of non-limiting example and in which:

FIG. 2 is a cross-sectional view, at an enlarged scale, of a detail of FIG. 1.

DETAILED DESCRIPTION OF THE INVENTION

Figure 1:
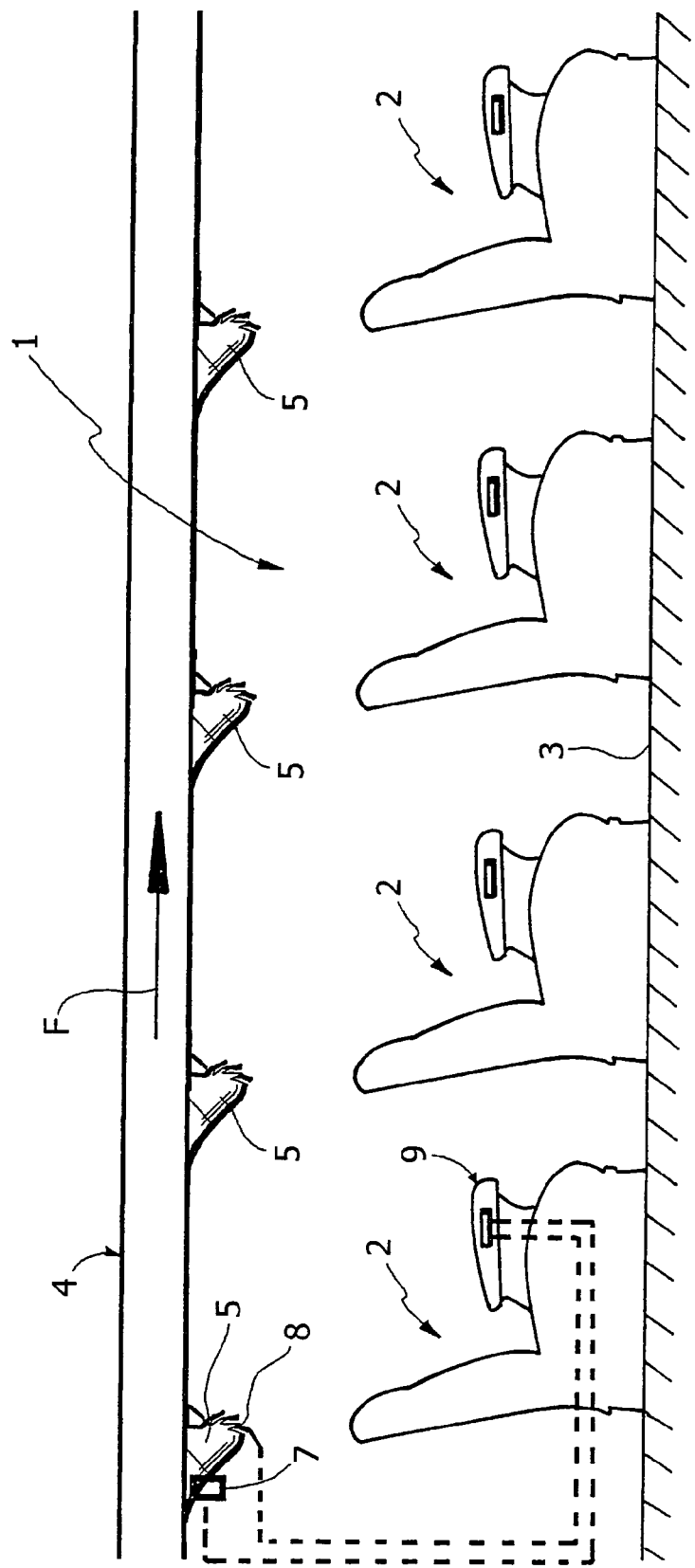
FIG. 1 is a schematic side view of an air-distribution system according to the invention.

In FIG. 1, the reference number 1 designates as a whole a passenger cab of a means of transport, such as an aeroplane, a train, or a bus, which has an aligned row of seats 2 fixed to the floor 3, and a duct 4, which is extends longitudinally adjacent to the row of seats 2 and is traversed by a flow of air F coming from a source of conditioned air (not illustrated). The duct 4 forms part of a closed circuit, for example with a delivery branch that supplies air to a row of seats and a return branch that supplies air to another row of seats. Substantially, in a position corresponding to each seat 2, the duct 4 has an outlet 5 consisting of an open duct that branches tangentially off the main duct 4.

As may be seen in FIG. 2, each duct 5 has a curved wall 5a that extends tangentially starting from a wall 4a of the main duct 4. In said area, the wall 4a has a separate part constituting a mobile element 6, which can be controlled, by means of an actuator 7, for example consisting of a bistable electromagnet, between a first position of rest, in which said element extends on the prolongation of the wall 4a and does not interfere with the air flow through the main duct 4, and a second position, designated by a dashed line.

In the aforesaid first position, a part of the flow F exits through the outlet 5 in so far as it remains adherent, by Coanda effect, to the wall 4a and then to the wall 5a of the outlet 5. When the mobile element 6 is brought into its second operative position (dashed line), the main flow F is invited to stick, once again by Coanda effect, to the opposite wall 4b of the main duct 4 and to skip the outlet 5, which therefore remains masked with respect to the main flow F. In said condition, the outlet 5 is hence virtually closed, even though no closing valve is provided in it.

In FIG. 1 the reference number 9 designates an armrest with a control panel provided on the seat 2, said control panel carrying one or more switches connected to the actuator 7, as well as to a possible further actuator of the directional vanes of an outflow opening 8 associated to the outlet 5. Of course, control of the mobile element 6 can be obtained by means of an actuator of any type, even one that is different from what is illustrated schematically in FIG. 3, or else it is also possible to provide a manual control for said element. The same applies to the directional vanes of the outflow opening 8, which could even be totally absent.

It is moreover evident that the device based upon the Coanda-effect for controlling the flow of air provided according to the invention could also be obtained in a way different from what is illustrated, by way of example, in the drawings. For example, instead of the mobile element 6, an opening could be provided on the wall 4a communicating with an environment of air under pressure or negative pressure, in which case the mobile element could consist of a valve element that controls said opening.

From the foregoing description, it is evident that the idea underlying the present invention is that of applying a Coanda-effect air distributor to a succession of outlets of a ventilation duct associated to a row of seats in a passenger compartment of a means of transport of any type, or even in the room of a building.

Of course, without prejudice to the principle of the invention, the details of construction and the embodiments may vary widely with respect to what is described and illustrated herein, without thereby departing from the scope of the present invention.

What is claimed is:

1. A system for the distribution of air to a row of seats in a passenger compartment of a means of transport or in a room of a building, comprising:
    a main duct extending along the row of seats and having a plurality of outlets distributed along the duct; and
    control means associated to each outlet for control of the passage of air through it,
    wherein said control means associated to each outlet are designed to control the air flow through the outlet by means of the Coanda effect,
    wherein the control means associated to each outlet comprise a mobile element having a first operative position, in which the air flow of the main duct is deviated towards the outlet, and a second operative position, in which said outlet is masked with respect to the air flow of the main duct,
    wherein the main duct extends longitudinally in the passenger compartment or in the room and extends orthogonally to a transverse arrangement of seat rows, and
    wherein the main duct comprises said outlets that are longitudinally aligned along the duct and each such outlet is provided with a device that exploits the Coanda effect.

2. The air-distribution system according to claim 1, wherein each outlet has a curved wall that branches off tangentially from a corresponding wall of the main duct.

3. The air-distribution system according to claim 2, wherein, in the first operative position, said mobile element is in a retracted position, in which it does not interact with the main flow, so that a part of the air flow that laps the aforesaid wall of the main duct exits through the outlet, remaining adherent, by Coanda effect, to said curved wall of the outlet.

4. The air-distribution system according to claim 3, wherein, in its second operative position, the mobile element projects into the main flow so as to invite the flow to adhere, by Coanda effect, to a wall of the main duct opposite to the wall, from which there branches off the curved wall of the outlet.

5. The air-distribution system according to claim 1, wherein said mobile element is controlled manually.

6. The air-distribution system according to claim 1, wherein it comprises actuator means for control of said mobile element.

7. The air-distribution system according to claim 6, wherein said actuator means are chosen between electromagnetic actuators, shape-memory actuators, and piezoelectric actuators.

8. The air-distribution system according to claim 1, wherein associated to each outlet is an outflow opening provided with directional vanes.

9. The air-distribution system according to claim 8, wherein the system comprises actuator means for operating the directional vanes of the outflow openings.

10. A system for the distribution of air to a row of seats in a passenger compartment of a means of transport or in a room of a building, comprising:
    a main duct extending along the row of seats and having a plurality of outlets longitudinally distributed along the duct and in direct communication with the duct; and
    control means associated to each outlet for control of the passage of air through it,
    wherein said control means associated to each outlet are designed to control the air flow through the outlet by means of the Coanda effect at each outlet, and
    wherein the control means associated to each outlet comprise a mobile element having a first operative position, in which the air flow of the main duct is deviated towards the outlet, and a second operative position, in which said outlet is masked with respect to the air flow of the main duct.

* * * * *